(12) United States Patent
Chen et al.

(10) Patent No.: US 11,320,580 B2
(45) Date of Patent: May 3, 2022

(54) LIGHT DIRECTING SHEET, BACKLIGHT MODULE, AND DISPLAY DEVICE

(71) Applicants: Radiant(Guangzhou) Opto Electronics Co., Ltd, Guangdong (CN); Radiant Opto Electronics Corporation, Kaohsiung (TW)

(72) Inventors: Wei-Hsuan Chen, Kaohsiung (TW); Yung-Hui Tai, Kaohsiung (TW)

(73) Assignees: RADIANT (GUANGZHOU) OPTO-ELECTRONICS CO. LTD., Guangdong (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/336,837

(22) Filed: Jun. 2, 2021

(65) Prior Publication Data
US 2021/0333465 A1 Oct. 28, 2021

Related U.S. Application Data (63) Continuation of application No. PCT/CN2020/086193, filed on Apr. 22, 2020.

(51) Int. Cl.
*F21V 8/00* (2006.01)
(52) U.S. Cl.
CPC .................. *G02B 6/0053* (2013.01)
(58) Field of Classification Search
CPC .. G02B 6/0053; G02B 6/0055; G02B 6/0051; G02B 6/0068; G02B 6/005
See application file for complete search history.

(56) References Cited

U.S. PATENT DOCUMENTS

| 3,988,609 A | 10/1976 | Lewin |
| 2014/0321163 A1* | 10/2014 | Kao ..................... G02B 6/0053 |
| | | 362/619 |
| 2016/0018586 A1* | 1/2016 | Chuang ............... G07F 17/3211 |
| | | 362/606 |

FOREIGN PATENT DOCUMENTS

| CN | 201289558 Y | 8/2009 |
| CN | 207541371 U | 6/2018 |
| CN | 208999593 U | 6/2019 |
| CN | 211786510 U | 10/2020 |
| JP | 2009026554 A | 2/2009 |

(Continued)

*Primary Examiner* — Andrew J Coughlin
*Assistant Examiner* — Jessica M Apenteng
(74) *Attorney, Agent, or Firm* — Muncy, Geissler, Olds & Lowe, P.C.

(57) ABSTRACT

A light directing sheet includes a light-incident side and a light-exit side opposite to the light-incident side. The light-exit side can be divided into a middle area and two side areas along an X-axis direction. The side areas are located on both sides of the middle area. A plurality of strip structures are protruded and arranged on each of the side areas, and the strip structures are arranged along the direction of the X axis and elongated along the direction of a Y axis perpendicular to the X axis. The strip structures are in a staggered arrangement of high microstructures and low microstructures with a height lower than the high microstructures. Through the type and arrangement of the strip structures on the light directing sheet, the light with an excessively large angle can be refracted again. A backlight module and a display device include the light directing sheet.

10 Claims, 13 Drawing Sheets

(56) References Cited

FOREIGN PATENT DOCUMENTS

| KR | 20140069926 A | 6/2014 |
|----|---------------|--------|
| TW | I-346813 B | 8/2011 |
| TW | I-560479 B | 12/2016 |

\* cited by examiner

LIGHT DIRECTING SHEET, BACKLIGHT MODULE, AND DISPLAY DEVICE

RELATED APPLICATIONS

This application is a continuation application of International Application No. PCT/CN2020/086193, filed on, 2020 Apr. 22. The entire disclosures of all the above applications are hereby incorporated by reference.

BACKGROUND OF THE INVENTION

1. Field of the Invention

The present invention relates to an optical element, and especially to an optical film, a backlight module, and a display device which solve the problem of large-angle light leakage and increase the contrast at large-angle.

2. Description of the Prior Art

The LCD panel does not have the function of light emission, so a backlight module must be arranged under the LCD panel to provide a surface light source, so that the LCD panel can achieve the purpose of display.

Generally speaking, light source modules can be categorized into direct-lit light source modules and side-lit light source modules. Take the direct-lit light source module as an example, it usually includes a plurality of light-emitting elements, a reflector to concentrate the light from the light-emitting elements to the normal direction, and a plurality of optical films. The combination of the parts mentioned above is to reduce the viewing angle of the light beams and improve the brightness in the normal direction and light output efficiency. On the other hand, taking the side-lit light source module as an example, it generally includes a light guide plate, a reflector located below the light guide plate, a light source located on the lateral side of the light guide plate, and the aforementioned optical films. The light beam emitted from the light source enters the light guide plate from the light incident surface on the lateral side of the light guide plate, and is guided into the light guide plate due to total internal reflection. The multiple dots located on the bottom surface of the light guide plate will destroy the rule of total internal reflection of the light, thus allowing the light beams to be emitted from the light emitting surface of the light guide plate. The aforementioned optical films will improve the brightness in the normal direction and light output efficiency, thereby forming the surface light source as required.

However, whether it is a direct-lit light source module or a side-lit light source module, when the screen is larger, the viewing angle of both sides of the screen will also become larger. Light leakage occurs at large viewing-angle, causing white fog and lowering the contrast which affects the viewing quality.

SUMMARY OF THE INVENTION

One object of the present invention is to provide an optical film that can improve the contrast between light and dark in the large viewing angle area on both lateral sides of the screen.

The optical film includes a light-incident side and a light-exit side opposite to the light-incident side. The light-exit side of the optical film can be divided into a middle area and two side areas along an X-axis direction. Said side areas are located on both sides of the middle area respectively. A plurality of strip structures are protruded and arranged on each of said side areas of the light-exit side, and the strip structures are arranged along the direction of the X axis and elongated along the direction of a Y axis perpendicular to the X axis. The strip structures are in a staggered arrangement of high microstructures and low microstructures with a height lower than the high microstructures.

Another object of the present invention is to provide a backlight module.

The backlight module includes a light source, an optical plate for receiving the light source, a set of films disposed on the optical plate, and the optical film disposed on the set of film as described above.

Another object of the present invention is to provide a display device.

The display device includes the backlight module as described above, and a display panel arranged on the backlight module. Wherein, the X axis is defined as the horizontal direction in which the user views the display panel, and the Y axis is defined as the vertical direction in which the user views the display panel.

The effect of the present invention is that through the type and arrangement of the strip structures on the optical film, the present invention can refract the light of an excessively large angle again, solve the problem of light leakage and increase the contrast at large viewing angle.

DETAILED DESCRIPTION OF THE PREFERRED EMBODIMENTS

The preferred embodiments of this invention are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Figure 1:
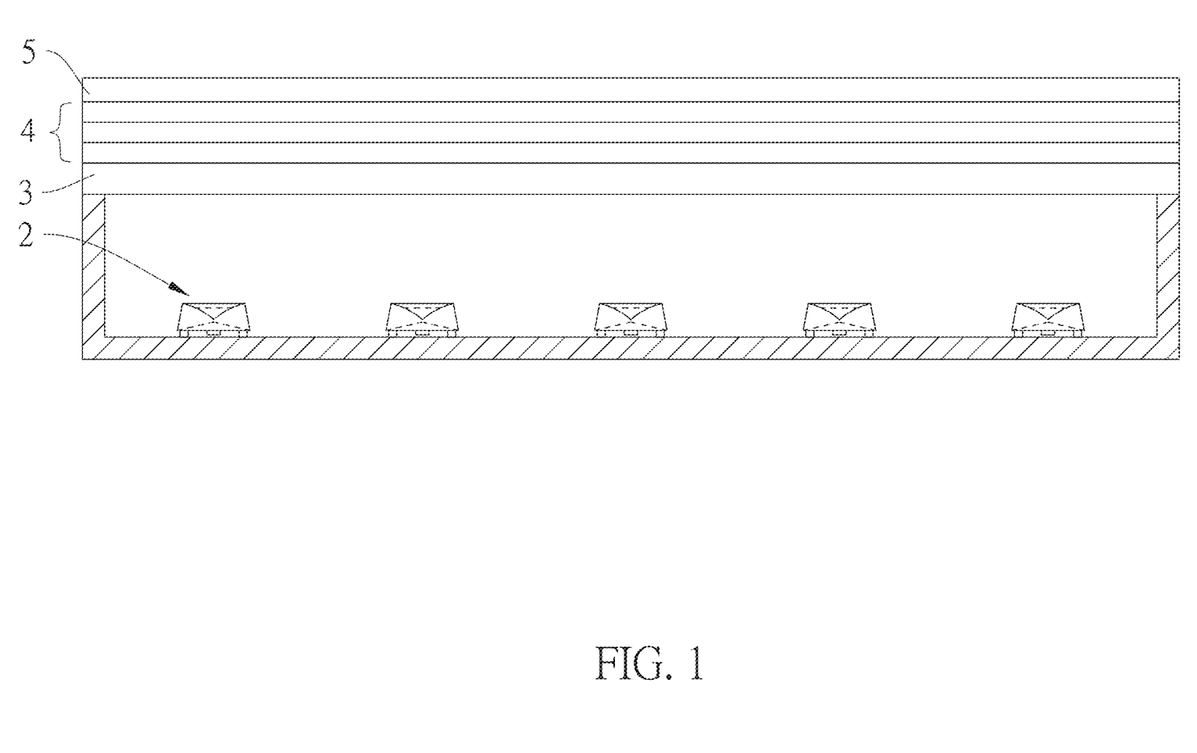
FIG. 1 is a schematic diagram of a backlight module according to an embodiment of this invention.

Refer to FIG. 1, a preferred embodiment of the backlight module of the present invention, includes a light source 2, an optical plate 3 for receiving the light generated from the light source 2, a set of films 4 arranged on the optical plate 3, and an optical film 5 arranged on the set of films 4. The set of films 4 may include a brightness enhancement film, a prism sheet, and a diffusion film, but it is not limited to this. In this embodiment, the backlight module is a direct-type backlight module, so the light source 2 has a plurality of light emitting diodes (LEDs) arranged in an array below the bottom surface of the optical plate 3, and the optical plate 3 is a diffuser plate whose characteristic is to diffuse the light emitted from the LEDs arranged in an array through the optical composite material of the diffuser plate to produce a surface light source with uniform brightness. In other embodiments, the backlight module can also be designed as a side-type backlight module, so the light source 2 has a plurality of LEDs arranged in a straight line on the lateral side of the optical plate 3, and the optical plate 3 is a light guide plate. The light emitted from the LEDs enters the light guide plate from the lateral surface of the light guide plate, and the total internal reflection path of the light in the light guide plate is destroyed by the special structure on the bottom surface of the light guide plate to produce a surface light source with uniform brightness.

Figure 2:
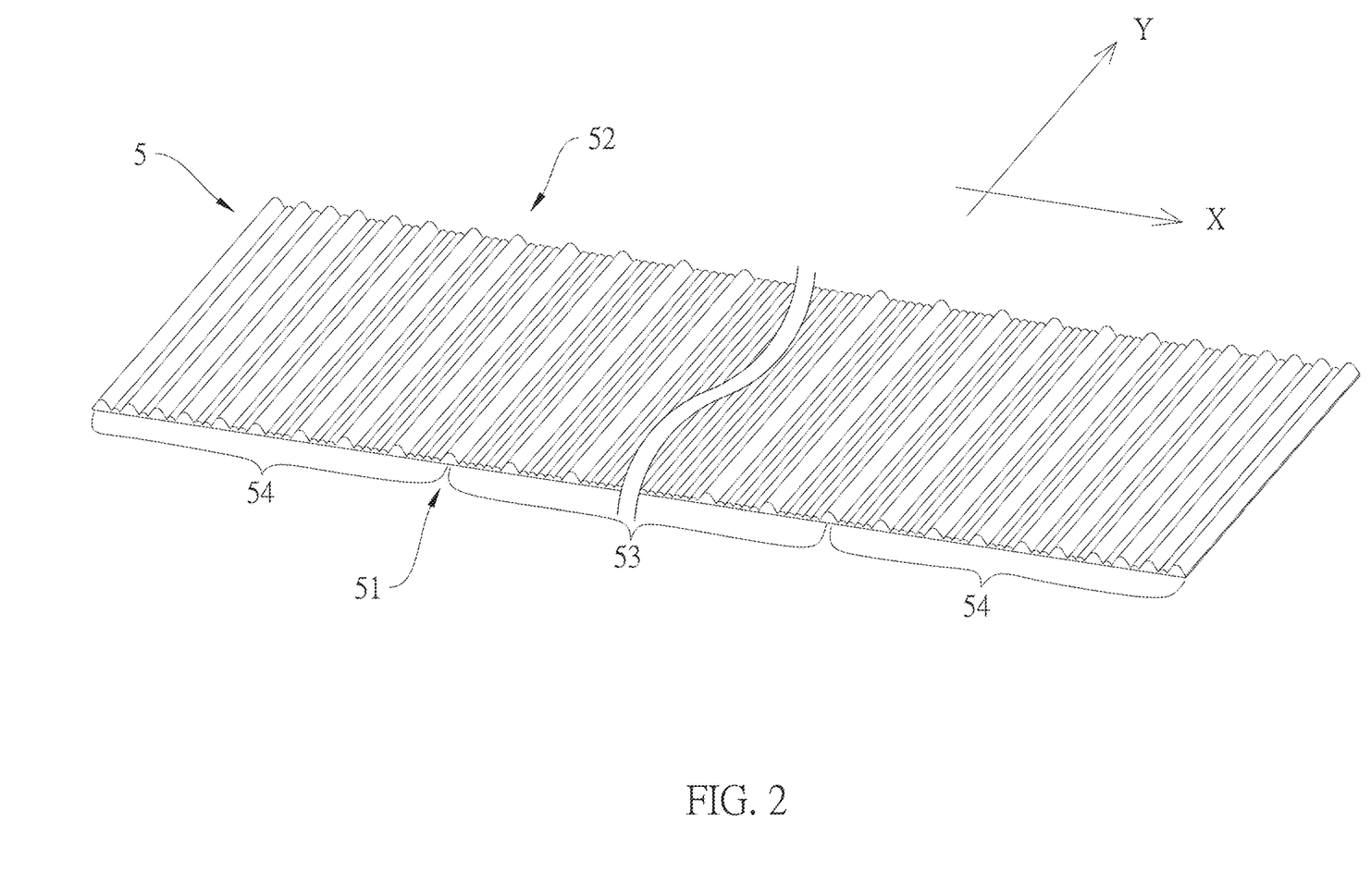
FIG. 2 is a perspective view schematic diagram showing the structure of an optical film shown in the FIG. 1.
Figure 3:
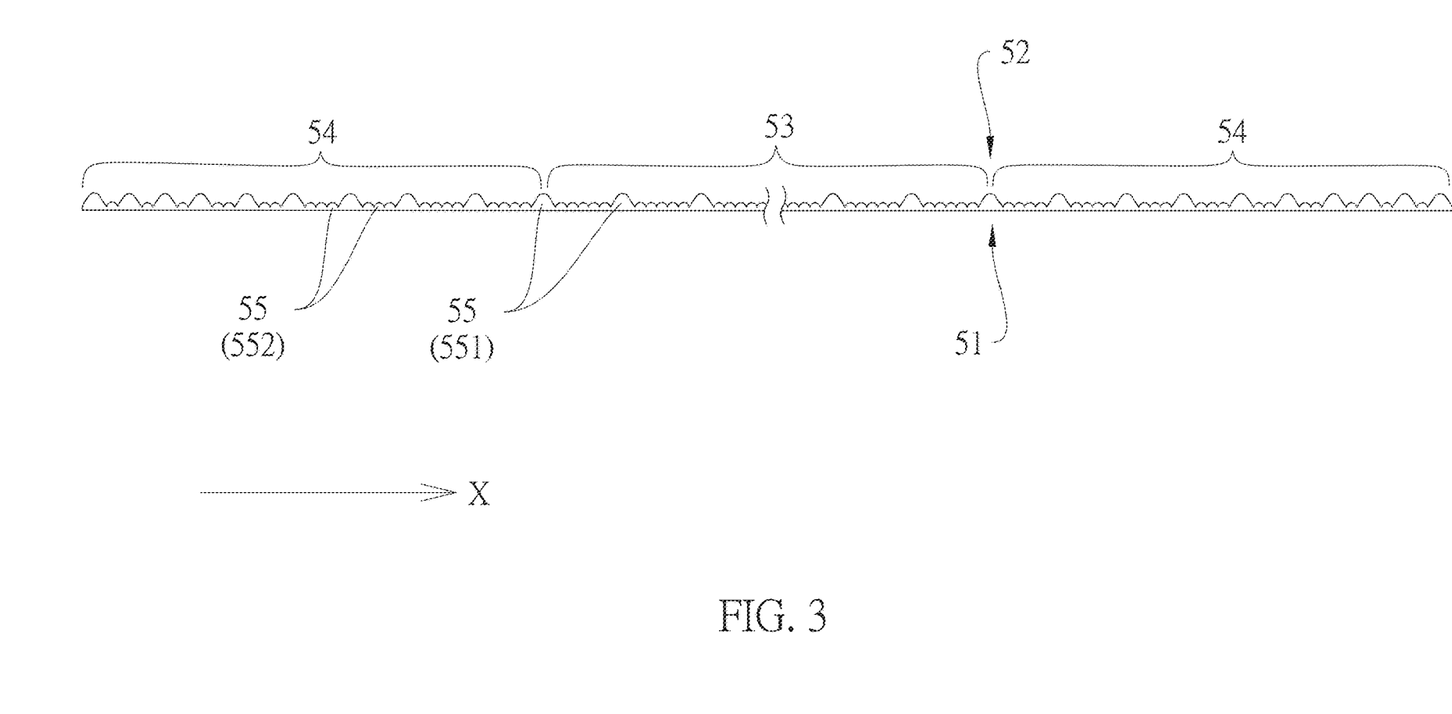
FIG. 3 is a side view of the optical film shown in the FIG. 2.

Referring to FIG. 2 and FIG. 3, the optical film 5 has a light-incident side 51 and a light-exit side 52 opposite to the light-incident side 51. Since the optical film 5 is located above the optical plate 3, the light-incident side 51 of the optical film 5 faces downwards to the light-emitting surface of the optical plate 3. The light-exit side 52 of the optical film 5 faces upwards. The light-exit side 52 of optical film 5 can be divided into a middle area 53 and two side areas 54 along an X-axis direction, and the two side areas 54 are located on both sides of the middle area 53 respectively. Each side area 54 of the light-exit side 52 is arranged with a plurality of strip structures 55, and the strip structures 55 are protruded and arranged along the direction of the X axis and elongated along the direction of a Y axis perpendicular to the X axis. The strip structures 55 are in a staggered arrangement of high microstructures 551 and low microstructures 552 whose height is lower than the high microstructures 551. It should be particularly noted that the strip structures 55 are closely arranged with no gaps between each other.

In addition, in this embodiment, the number of the high microstructures 551 does not exceed the number of the low microstructures 552 in each side area 54. The middle area 53 of the light-exit side 52 of the optical film 5 is also arranged with a plurality of strip structures 55 which mentioned above, and a small amount of the high microstructures 551 and a large amount of the low microstructures 552 are in a staggered arrangement in the middle area 53. That is to say, no matter in the middle area 53 or the side areas 54, the number of the high microstructures 551 does not exceed the number of the low microstructures 552.

Figure 4:
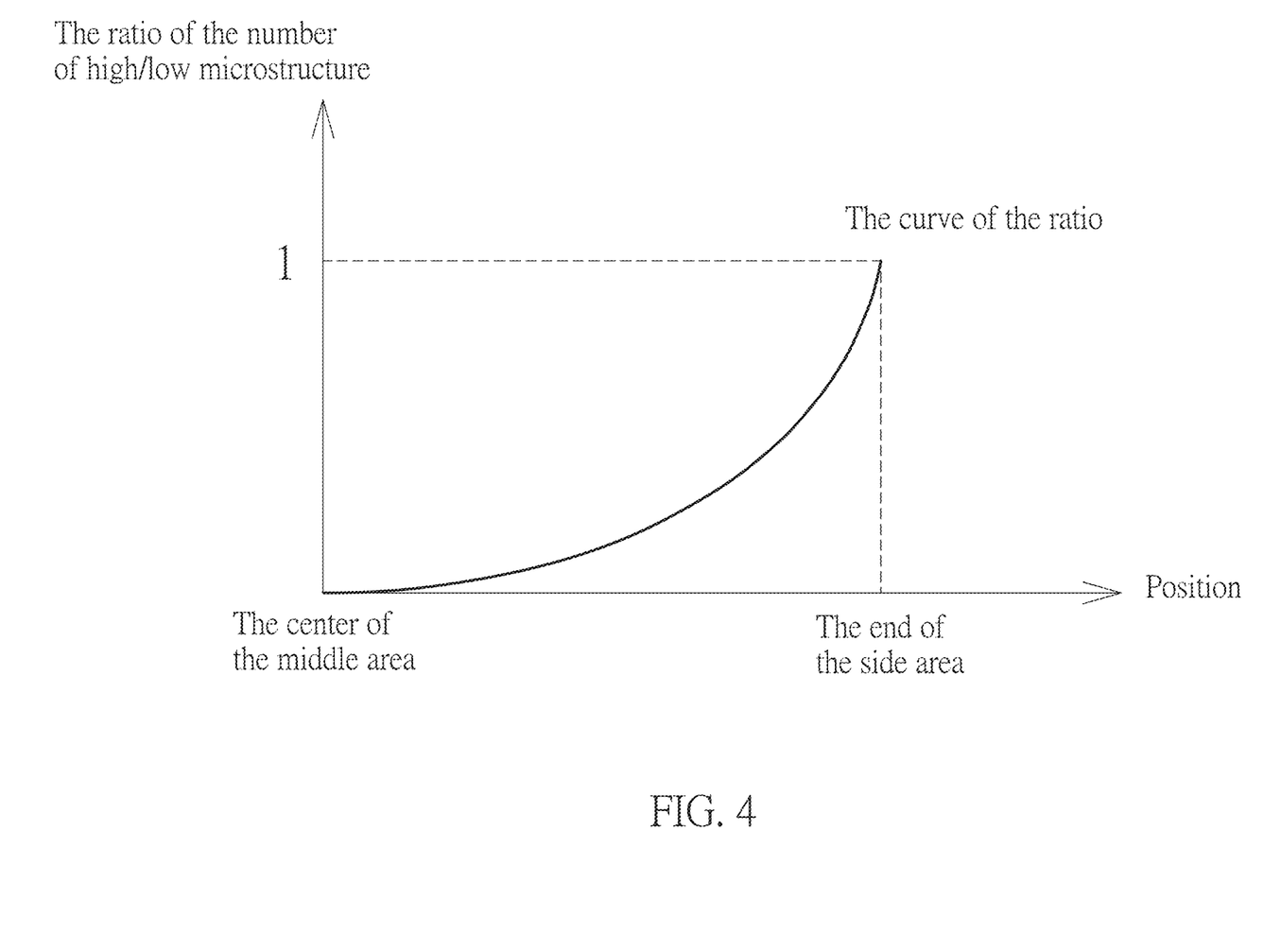
FIG. 4 is a curve diagram illustrating the change in the ratio of high microstructures to low microstructures on the optical film.

It should be particularly noted that, in this embodiment, the high microstructures 551 and the low microstructures 552 are both protruded with arc-shape. The ratio of the high microstructures 551 to the low microstructures 552 gradually increases from the center of the middle area 53 to both side areas 54 along the direction of the X axis. The ratio of the high microstructures 551 to the low microstructures 552 is equal to 1 at the end of each side area 54 away from the middle area 53 along the X axis. That is to say, there are a plurality of low microstructures 552 repeatedly arranged in the middle area 53, and then a high microstructure 551 is arranged on both sides of the low microstructures 552. The number of the low microstructures 552 will gradually decrease from the middle area 53 to both side areas 54. Taking FIG. 2 and FIG. 3 as an example, there are a plurality of low microstructures 552 repeatedly arranged in the center of the middle area 53, then two high microstructures 551 are arranged on both sides of the low microstructures 552 respectively, after that there are four low microstructures 552 and one high microstructure 551 repeatedly arranged, and then there are three low microstructures 552 and one high microstructure 551 repeatedly arranged. It means that the repeating number of the low microstructures 552 gradually decreases from the middle area 53 to each side area 54 until the repeating number of the high microstructure 551 and the repeating number of the low microstructure 552 is the same, therefore the ratio of the high microstructures 551 to the low microstructures 552 is equal to 1. As shown in FIG. 4, the ratio of the high microstructures 551 to the low microstructures 552 is gradually increased from less than 1 to equal to 1.

Figure 5:
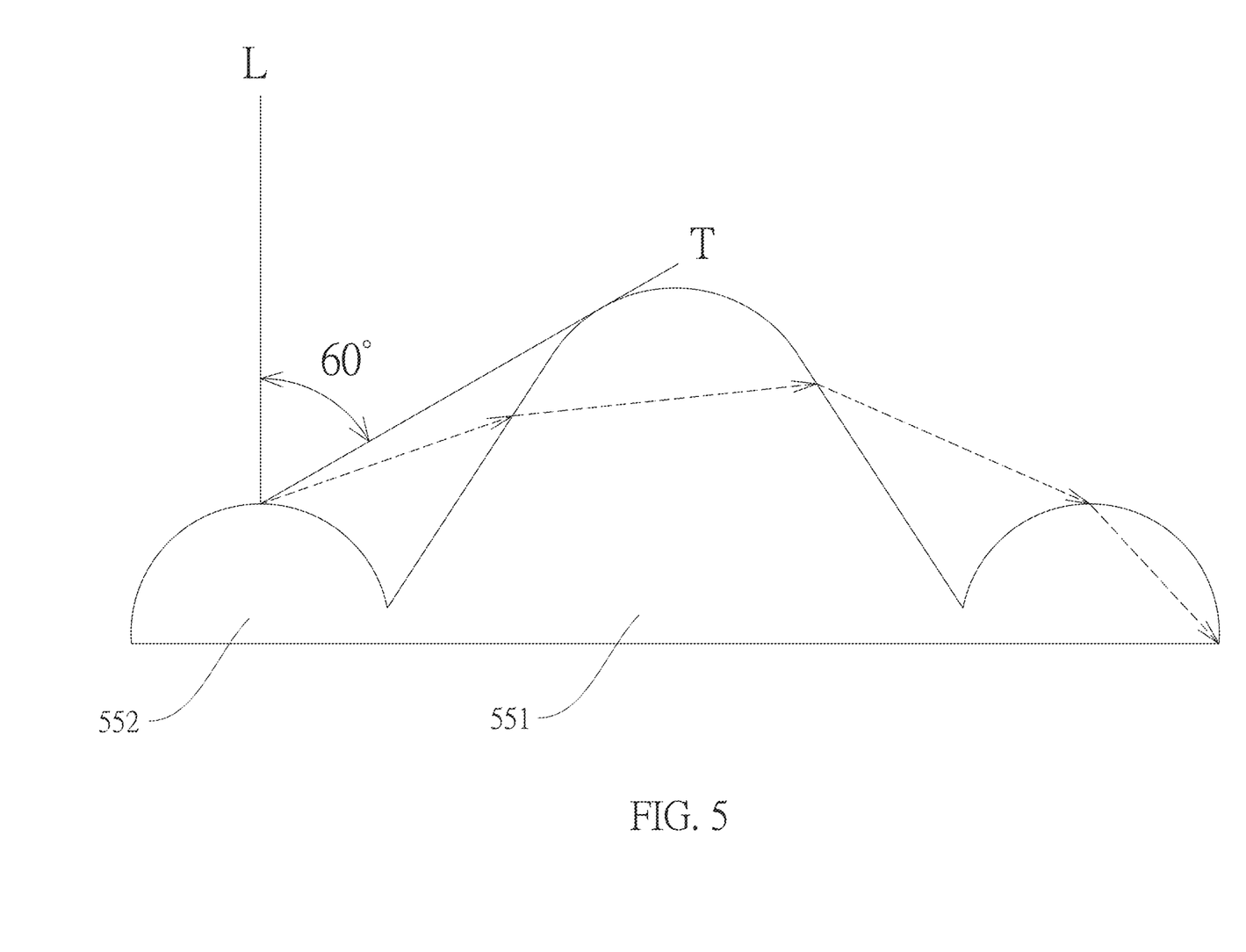
FIG. 5 is a partial enlarged schematic diagram illustrating the detailed structure of the high microstructure and the low microstructure.

Following is a more detailed description of the structure relationship between the high microstructures 551 and the low microstructures 552. Referring to FIG. 5, define a centerline L that vertically passes through the vertex of any low microstructure 552, and a tangent line T that passes through the vertex and is tangent to the adjacent high microstructure 551. The acute angle between the centerline L and the tangent line T is greater than or equal to 60 degrees. In this embodiment, 60 degrees is taken as an example. Through the above-mentioned structural, when light is emitted from the low microstructure 552, the light whose emit angle is greater than 60 degrees will be refracted into the optical film 5 through the adjacent high-microstructure 551 so as to reduce the chance of direct emission, thereby reducing the amount of light (i.e. brightness) in the large-angle area. In other embodiments, the acute angle between the centerline L and the tangent line T can be designed to be other angle, such as 70 degrees, so that when the emit angle of the light out from the low microstructure 552 is greater than 70 degrees, the light will be refracted into the optical film 5 through the adjacent high microstructure 551.

Referring to FIG. 3 and FIG. 5, in this embodiment, when each side area 54 is provided with a small amount of the high microstructures 551 and a large amount of the low microstructures 552, the light emitted with large-angle by part of the low microstructures 552 can be refracted into the optical film 5 through the adjacent high-microstructures 551. Since the light leakage occurs at the two side areas 54 with high possibility, there is an arrangement of one low microstructure 552 and one high microstructure 551 at the very end of each side area 54. That is, when the ratio of the high microstructures 551 to the low microstructures 552 equals to 1, the light emitted with large-angle by each low-microstructures 552 can be refracted into the optical film 5, so as to reduce the chance of direct emission. Therefore, the ratio of the high microstructures 551 to the low microstructures 552 equals to 1 is the most suitable for application in those two side areas 54 where the possibility of light leakage is high.

Figure 6:
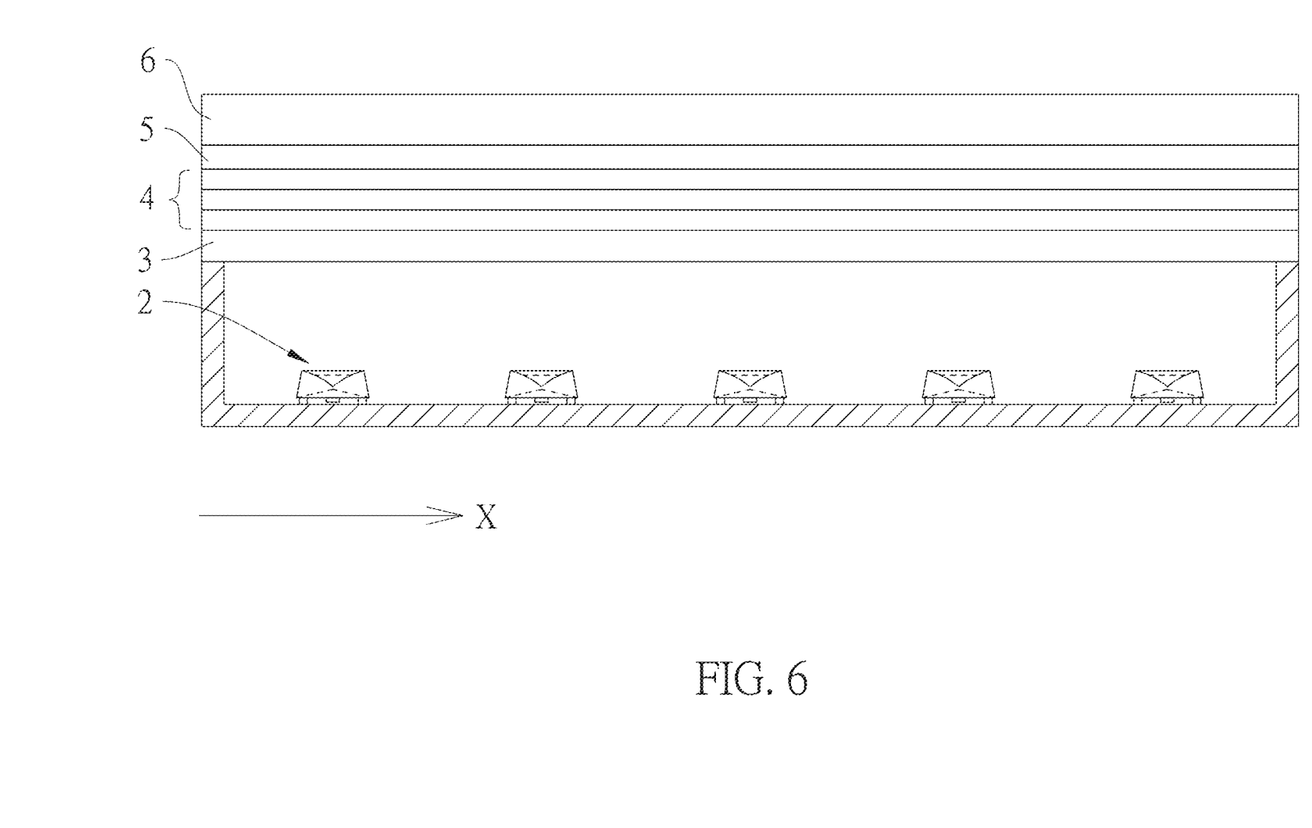
FIG. 6 is a side view schematic diagram of a display device according to an embodiment of this invention.

Referring to FIG. 6, a display device in an embodiment of the invention comprises the backlight module aforementioned, and a display panel 6.

Figure 7:
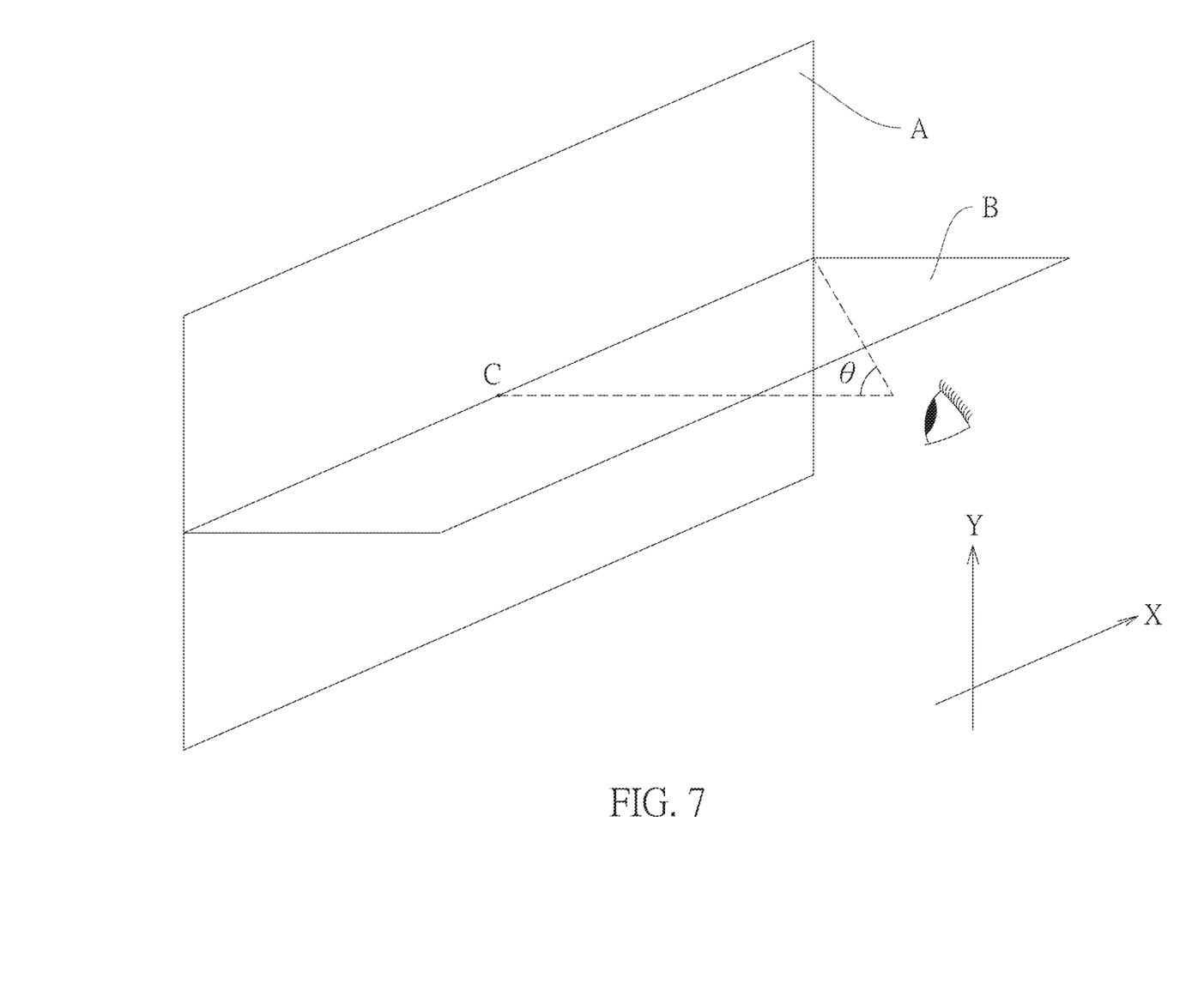
FIG. 7 is a schematic diagram showing the angle of the user viewing the screen, and the viewing surface is perpendicular to the light emitting surface.
Figure 8:
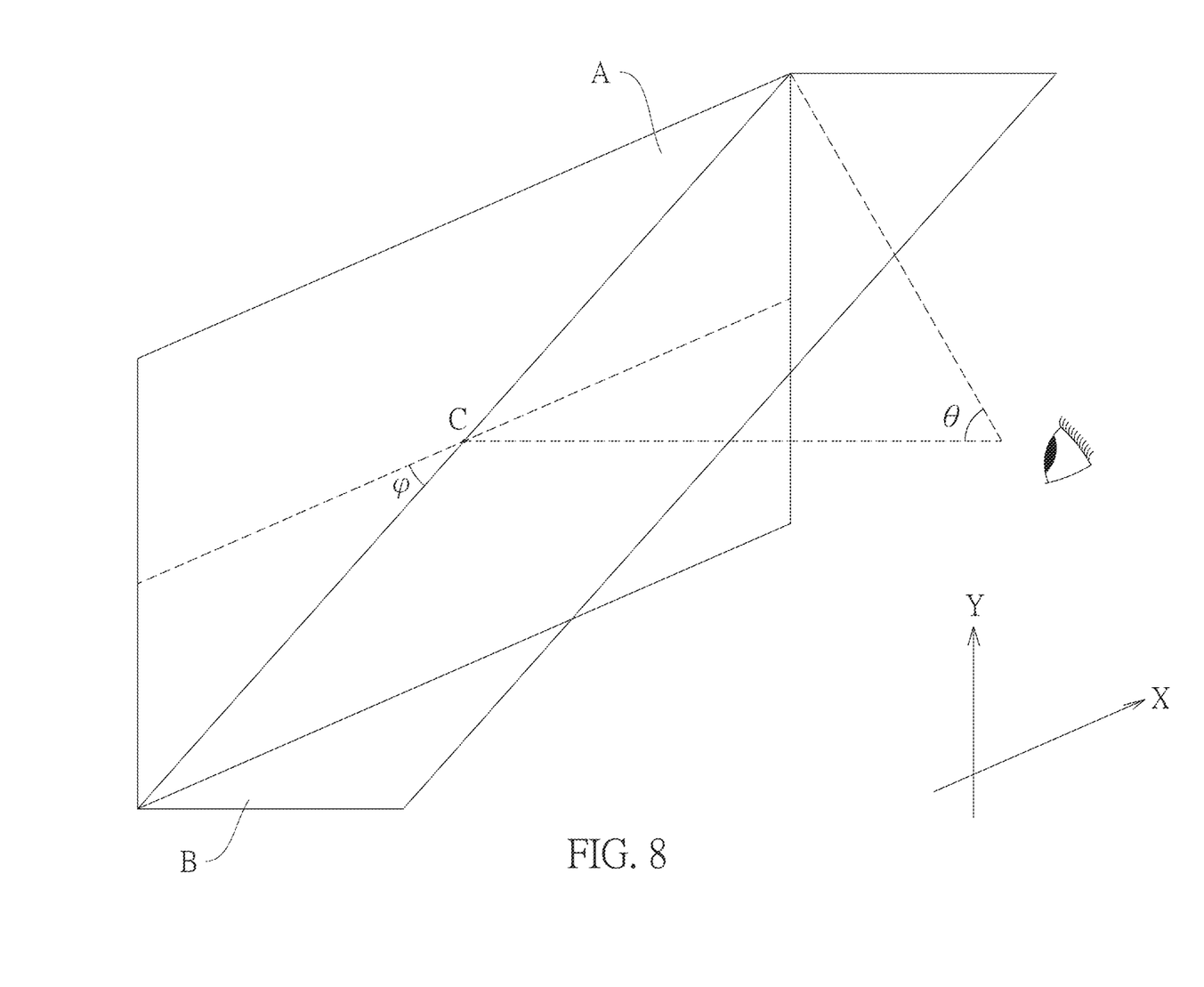
FIG. 8 is a schematic diagram showing the angle of the user viewing the screen, and the included angle between the viewing surface and the light emitting surface is 45 degrees.
Figure 9:
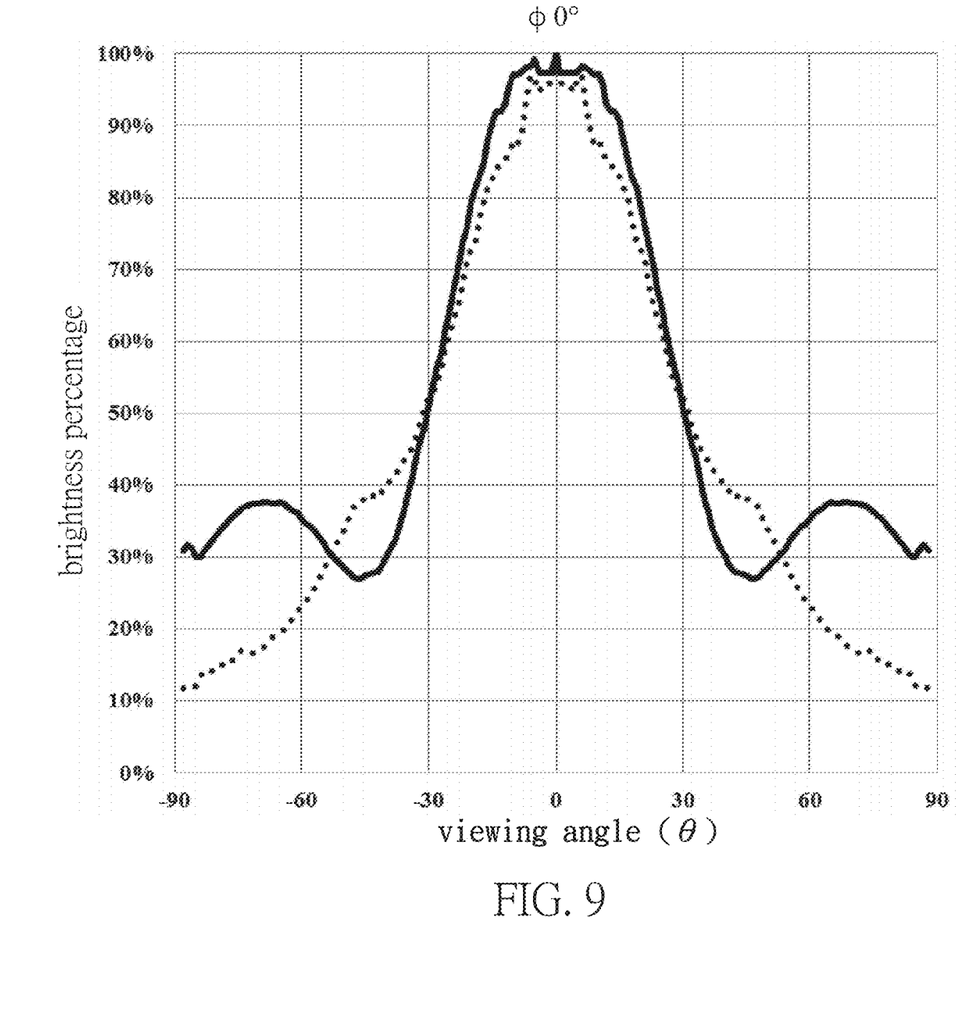
FIG. 9 is a curve diagram showing the percentage of brightness at different viewing angles when $\theta$ is 60 degrees and $\varphi$ is 0 degrees.
Figure 10:
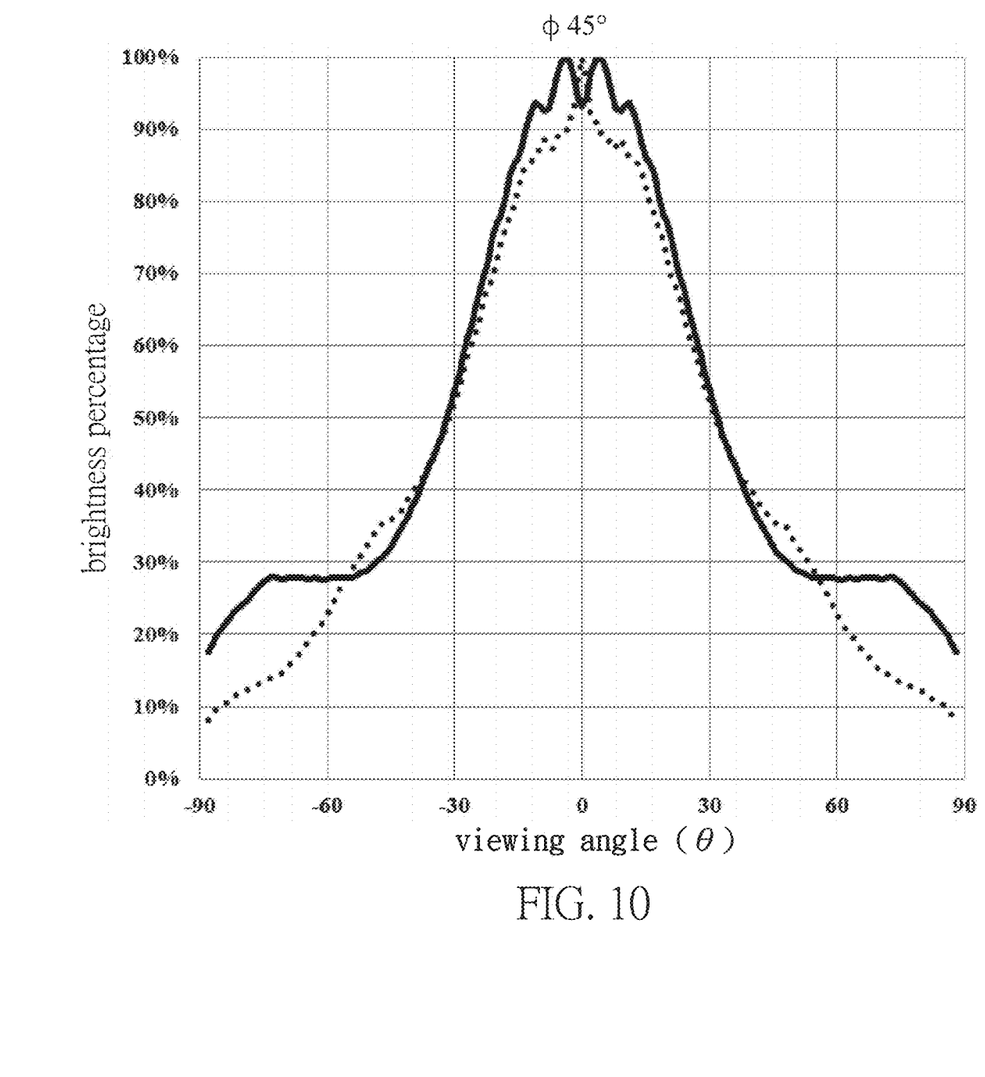
FIG. 10 is a curve diagram showing the percentage of brightness at different viewing angles when $\theta$ is 60 degrees and $\varphi$ is 45 degrees.

Next, the effect of the optical film 5 on large-angle light will be explained. Referring to FIG. 7, a plane A represents the light-emitting surface of the display device, which is also the viewing surface of the display device when using, and a plane B is perpendicular to the plane A. When the user is directly facing the center C of the plane A, the viewing angle θ of the center C is defined as 0 degrees. The X-axis is defined as the horizontal direction in which the user views the display device, and the Y-axis is defined as the vertical direction in which the user views the display device. In addition, the angle between plane B and the horizontal plane is defined as φ. In FIG. 7, φ is 0 degrees, and in FIG. 8, φ is 45 degrees. The angle of φ is used to simulate the reasonable angle of viewing the four corners or other edges of the display device. FIGS. 9 and 10 illustrate the brightness percentages in corresponding to FIG. 7 and FIG. 8. The solid line represents the result without using the optical film 5, and the dashed line represents the result of using the optical film 5.

According to the test results shown in FIG. 9 and FIG. 10, when the optical film 5 is used, the large-angle light will be refracted by the adjacent microstructure 551 so as to reduce the chance of direct light emission. Therefore, it is possible to reduce the brightness and light leakage and improve the contrast in areas above 60 degrees of viewing angle θ. The optical film 5 further reduces the white fog on both sides of the display device.

As the angle φ is 0 degrees (FIG. 9) and 45 degrees (FIG. 10) respectively, it can be observed that a more obvious brightness area illustrated with the solid line when the viewing angle θ is in the range between +60 degrees and +90 degrees, and between −60 degrees and −90 degrees (30%-40% in FIG. 9 and 20%-30% in FIG. 10) without the optical film 5. It means that the light leakage occurs when the viewing angle θ is large. The brightness illustrated with the dashed line will be reduced to less than 20% with the optical film 5, which means that the light leakage at the large viewing angle θ has been improved and reduced.

Referring to FIG. 3 and FIG. 5, in this preferred embodiment, when a small amount of the high microstructures 551 and a large amount of the low microstructures 552 are arranged on each side area 54, a part of the light with large-angle emitted from the low microstructures 552 can be refracted into the optical film 5 through the adjacent high microstructure 551. Since the light leakage of the two side areas 54 with larger viewing angle is more obvious than that of the middle area 53, the large-angle light emission of the side areas 54 easily exceeds the user's viewing range, and the large-angle light emission of the middle area 53 is still within the user's viewing range, therefore, the large-angle light emission in the middle area 53 is allowed in this preferred embodiment so that the number of high microstructures 551 in the middle area 53 can be minimized, and only the problem of large-angle light emission from the two side areas 54 needs to be solved. The number of high microstructures 551 is increased from the middle area 53 to the two side areas 54 so that the large-angle light emission of the low microstructures 552 of the two side areas 54 will be refracted into the optical film 5 by the adjacent high microstructures 551 so as to reduce the chance of direct emission.

Figure 11:
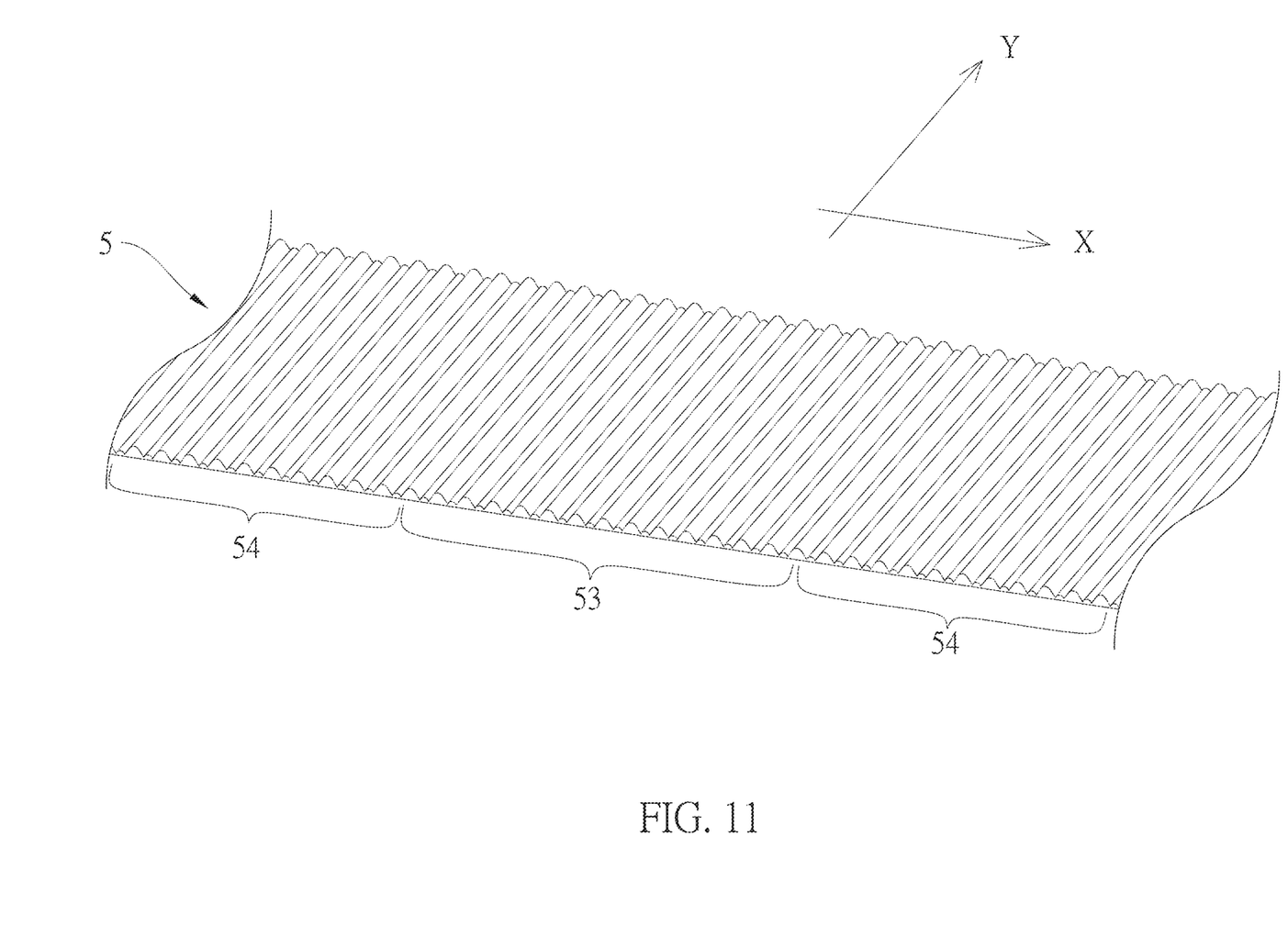
FIG. 11 is a perspective view schematic diagram of another type of an optical film.
Figure 12:
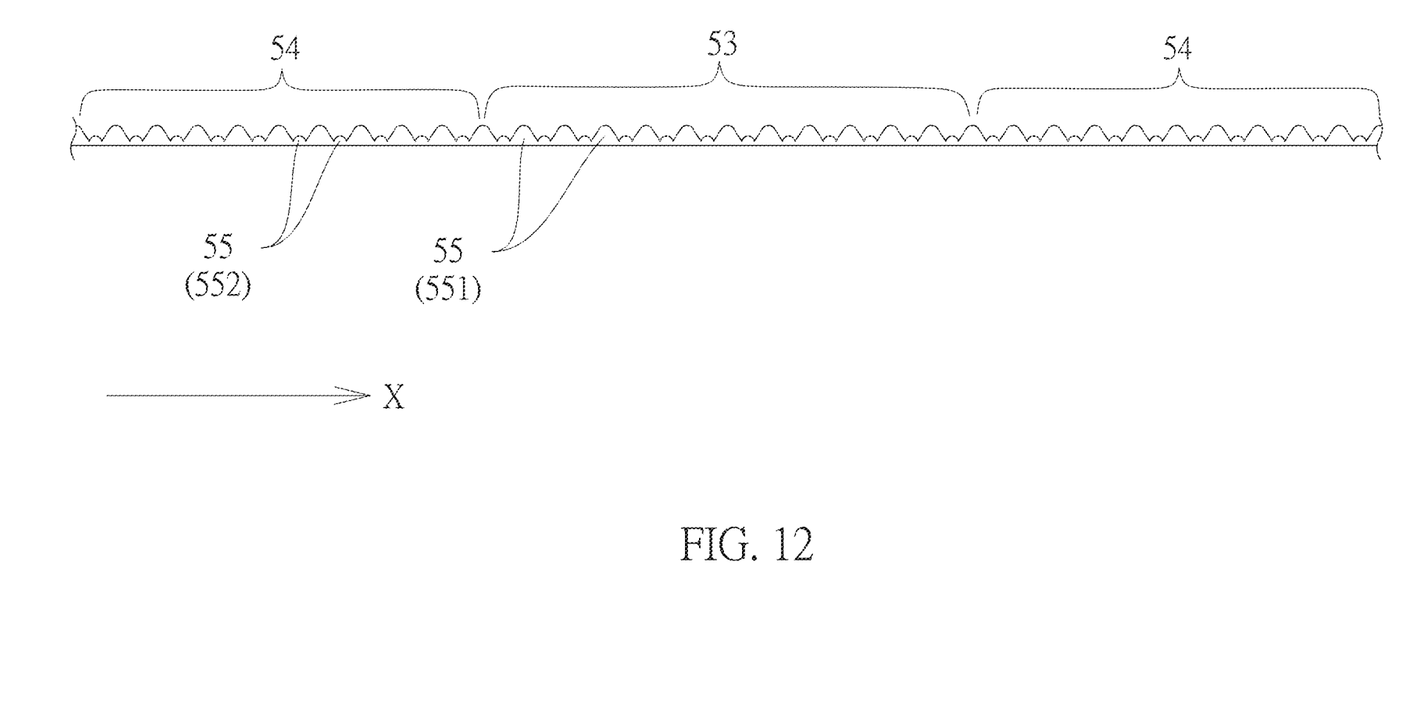
FIG. 12 is a side view of the optical film shown in the FIG. 11.

Referring to FIG. 11 and FIG. 12, another form of the optical film 5 different from FIG. 2 is disclosed. The number of the high microstructures 551 is the same as the number of the low microstructures 552. The high microstructures 551 and the low microstructures 552 are in a staggered arrangement whether in the middle area 53 or the side areas 54 of the optical film 5. That is, one high microstructure 551 and one low microstructure 552 are arranged repeatedly. Therefore, the large-angle light emitted from each low microstructure 552 will be refracted into the optical film 5 by the adjacent high microstructure 551, and the number of the high microstructures 551 at most will equal to the number of low microstructures 552, but will not exceed the number of low microstructures 552.

Figure 13:
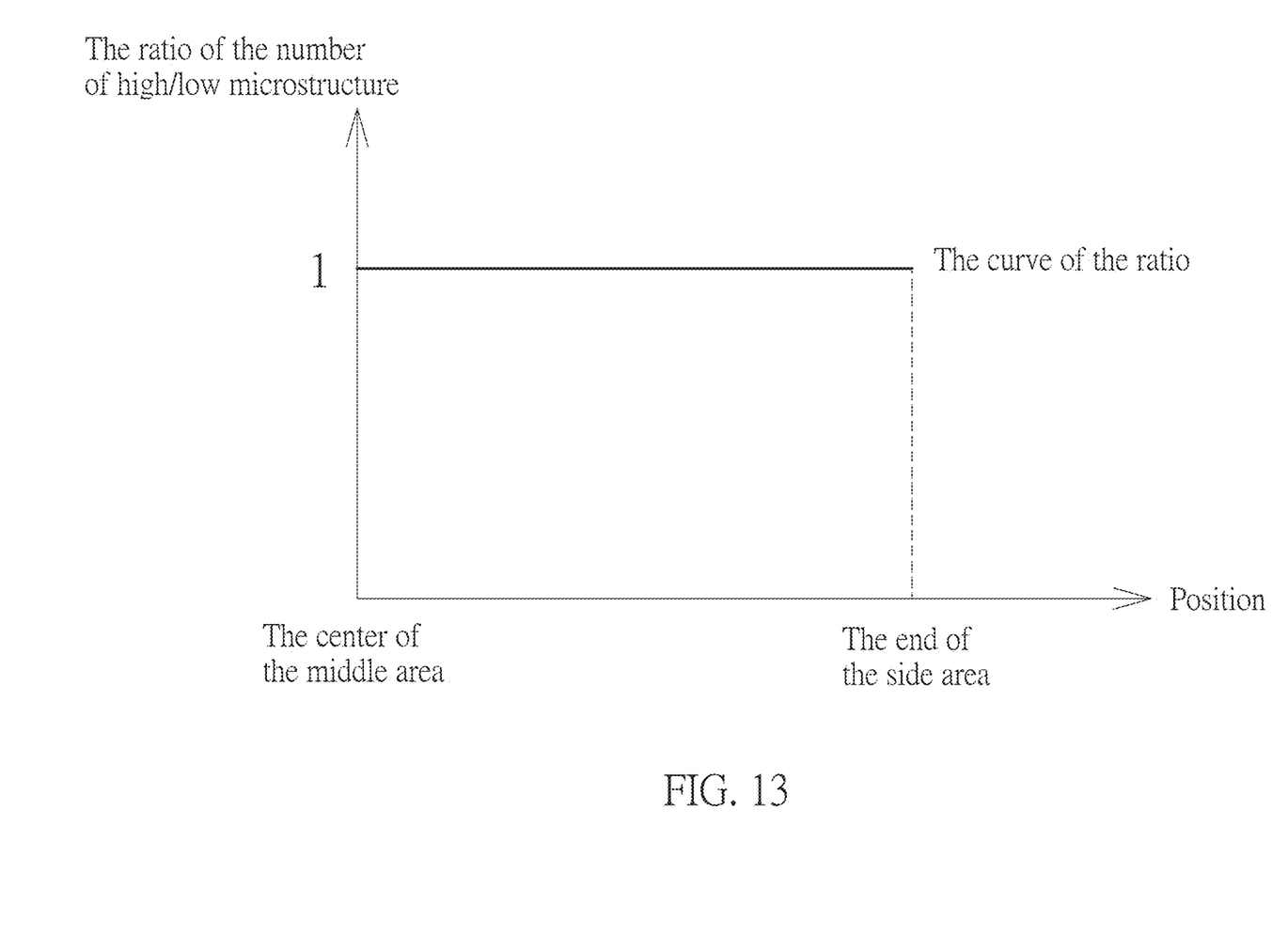
FIG. 13 is a curve diagram illustrating the change in the ratio of high microstructures to low microstructures in the optical film shown in the FIG. 11.

As shown in FIG. 13, the ratio of the high microstructures 551 to the low microstructures 552 in the middle area 53 is equal to the ratio of the high microstructures 551 to the low microstructures 552 in each side area 54, both ratios are equal to 1. In this way, in addition to the effect of refracting large-angle light, the optical film 5 is more convenient for cutting after production and has higher versatility.

As described above, through the type and arrangement of the strip structures 55 on the optical film 5, the present invention can refract the light of an excessively large angle again, solve the problem of light leakage and increase the contrast at large viewing angle.

Although the present invention is disclosed in the foregoing several preferred embodiments, they are not intended to limit the present invention. Those with ordinary skill in the art of the present invention can make some changes and modifications without departing from the spirit and scope of the present invention. Therefore, the protection scope of the present invention shall be subject to those defined by the attached claims. In addition, the scope of each claim constitutes an independent embodiment, and various combinations of claims and embodiments are within the scope of the present invention.

What is claimed is:

1. A light directing sheet, including a light-incident side and a light-exit side,
   wherein the light-exit side of the light directing sheet can be divided into a middle area and two side areas along an X-axis direction, and said side areas are located on both sides of the middle area respectively,
   wherein a plurality of strip structures are protruded and arranged on each of said side areas of the light-exit side, and the strip structures are arranged along the direction of the X axis and elongated along the direction of a Y axis perpendicular to the X axis,
   wherein the strip structures are in a staggered arrangement of high microstructures and low microstructures with a height lower than the high microstructures;
   wherein define a centerline of anyone of the low microstructures in the Y-axis direction;
   wherein define a tangential line passing through a vertex of anyone of the low microstructures, the tangential line is tangent to an adjacent high microstructure, and an acute angle between the centerline and the tangential line is greater than or equal to 60 degrees.

2. The light directing sheet as claimed in claim 1, wherein a ratio of the high microstructures to the low microstructures in an end of each side area away from the middle area along the X-axis direction is equal to 1.

3. The light directing sheet as claimed in claim 2, wherein a plurality of strip structures are protruded and arranged on the middle area of the light-exit side of the light directing sheet, and the strip structures are in a staggered arrangement of high microstructures and low microstructures with a height lower than the high microstructures.

4. The light directing sheet as claimed in claim 3, wherein the ratio of the high microstructures and the low microstructures in the middle area is equal to the ratio of the high microstructures and the low microstructures in each side area, and both ratios are equal to 1.

5. The light directing sheet as claimed in claim 3, wherein the ratio of the high microstructures to the low microstructures gradually increases from the center of the middle area to each side area along the X-axis direction.

6. The light directing sheet as claimed in claim 1, wherein a number of the high microstructures will not exceed a number of the low microstructures in each side area.

7. The light directing sheet as claimed in claim 1, wherein the strip structures are closely arranged.

8. A backlight module, comprising a light source, an optical plate for receiving the light from the light source, a set of films arranged on the optical plate, and the light directing sheet as claimed in claim 1 arranged on the set of films.

9. A display device, comprising the backlight module as claimed in claim 8, and a display panel arranged on the backlight module, wherein the X-axis is defined as the horizontal direction in which a user views the display panel, and the Y-axis is defined as the vertical direction in which the user views the display panel.

10. The light directing sheet as claimed in claim 1, wherein the light-exit side is opposite to the light-incident side.

\* \* \* \* \*